Figure 1:
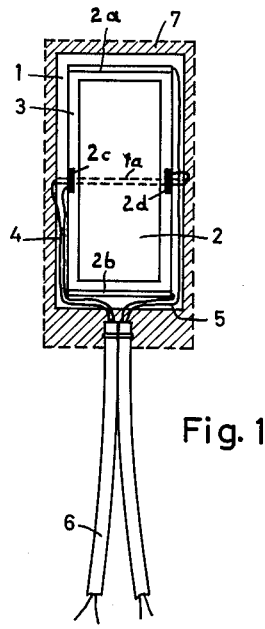

United States Patent Office 3,042,887
Patented July 3, 1962

3,042,887
MAGNETIC-FIELD RESPONSIVE RESISTANCE DEVICE
Friedrich Kuhrt and Karl Maaz, Nurnberg, Germany, assignors to Siemens-Schuckertwerke Aktiengesellschaft, Berlin, Germany, a corporation of Germany
Filed Sept. 16, 1959, Ser. No. 840,424
Claims priority, application Germany Sept. 15, 1958
16 Claims. (Cl. 338—32)

Our invention relates to magnetic-field responsive resistance devices of the type having a resistance body of semiconductor substance which varies its ohmic resistance when subjected to a magnetic field in a direction transverse to that of the current flowing through the resistance body. Such semiconductor devices are known as magnetic-field responsive resistors for various control, regulating or computing purposes in which the magnetically caused change in ohmic resistance, or the resulting change in voltage drop along the resistor, is utilized. Another type of such magnetically responsive semiconducting resistors is in form of Hall plates which, aside from the current supplying terminal electrodes, are provided with lateral probe electrodes (Hall electrodes) for generating a Hall voltage between the normally equipotential probes under the conjoint action of the electric current passing through the Hall plate and the magnetic field acting upon the plate in a direction transverse to the current flow and also transverse to the spacing direction of the Hall electrodes.

Relating to such various types of magnetic-field responsive electric resistance devices, it is an object of our invention to devise a resistance device, containing a semiconductor as described above, which, in comparison with those heretofore available, is distinguished by extreme stability with respect to thermal effects or bending forces.

The so-called $A_{III}B_V$ semiconductor compounds have been found well suitable as semiconducting substance for resistance bodies serving the above-mentioned purposes. These compounds are formed of substances from the third group and fifth group of the periodic system of elements. Particularly suitable, for example, are indium antimonide, indium arsenide, and such other compounds as known from the contribution of H. Welker and H. Weiss to Solid State Physics, vol. 3, published by Academic Press Inc., New York, 1956, pages 1–78, or from the contribution of F. A. Cunnell and E. W. Saker to Progress in Semiconductors, vol. 2, published by John Wiley & Sons Inc., 1957, pages 37 to 65.

The mechanical strength of such crystalline semi-conducting materials is rather limited, and it is often desirable to give the semiconductor bodies an extremely small thickness. For example, a Hall plate of indium arsenide may have a thickness of only 0.01 mm., a length of 8 mm., and a width of 4 mm. Consequently, the semiconductor bodies often required for the above-mentioned purposes are mechanically extremely sensitive with respect to stresses occurring during normal use of the devices.

It has become known to embed semiconductor plates of the above-described type in a housing or other mechanically strong envelope. For example, enclosures of metals or synthetic casting resins have been used; but such enclosures can only partially satisfy the desired purpose. An essential disadvantage of the known protective enclosures is the fact that they do not sufficiently safeguard the sensitive crystalline body from stresses due to thermal effects such as differences in thermal coefficients of expansion of the respective materials being used, when the device is subjected to varying temperatures.

It is, therefore, a more specific object of our invention to eliminate shortcomings of the latter type.

According to our invention the semiconductor plate or wafer is embedded between two plates of sinter ceramic. This makes it possible to give the sintered ceramic material the same temperature coefficient as possessed by the crystalline semiconductor body. As a result, when the sinter ceramic plates are subjected to thermal expansion or contraction, no tension is produced relative to the semiconductor plate located between them.

According to another feature of our invention the two plates of sinter ceramic are given the same mechanical properties. This is preferably done by making both of the same ceramic material and giving them the same thickness. In this case, the semiconductor plate is located in the neutral zone in the event of deformation by bending stresses, so that the semiconductor plate is not subjected to expanding or compressing forces.

An embodiment of a device according to the invention is illustrated by way of example on the accompanying drawing by a somewhat simplified illustration.

Figure 2:
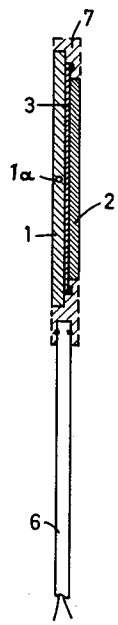
Figure 3:
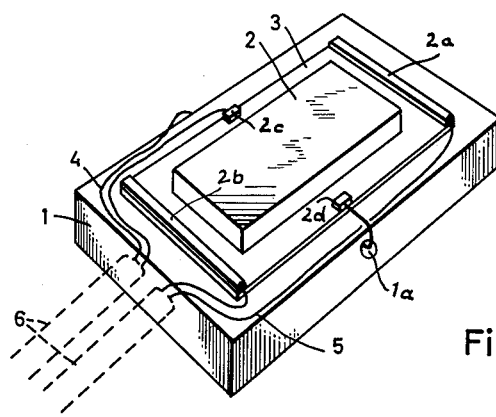

FIG. 1 is a front view of a Hall generator,
FIG. 2 a longitudinal section seen from the side, and
FIG. 3 is a perspective view of the generator assembly prior to embedding it in a casting resin.

The device comprises a base plate 1 of sintered ceramic material and a somewhat smaller cover plate 2 of the same material between which a semiconductor wafer 3 is tightly embedded in face-to-face contact with the two ceramic plates. The two plates 1 and 2 consist of a sinter ceramic material whose temperature coefficient is substantially the same as the temperature coefficient of the semiconductor wafer 3. The wafer, serving as a Hall plate, is provided with respective terminal electrodes 2a and 2b which extend along the entire length of the two narrow sides of the rectangular wafer. The plate is further provided with two Hall electrodes 2c and 2d located on the respective two long sides of the rectangle halfway between the current supply electrodes 2a and 2b. Connected to the current terminals 2a and 2b are respective leads 5, and connected to the Hall electrodes are respective leads 4. The lead 4 from electrode 2d passes through a bore 1a in ceramic plate 1. Each pair of leads extends away from the device through an insulating hose 6. The assembly of plates is embedded in an envelope 7 of silicone plastic such as methylsilicone resin, or silicone-containing phenyl or vinyl mixed condensates.

Suitable as sintered ceramic material for the purposes of the invention is aluminum oxide ($Al_2O_3$) having a temperature coefficient of expansion equal to $6.7 \cdot 10^{-6}/°$ C. Ferrites are likewise advantageously applicable, for example manganese-iron oxide, having a temperature coefficient of $5 \cdot 10^{-6}/°$ C. The temperature coefficient of the abovementioned ceramic materials are sufficiently close to those of the crystalline semiconductor materials best suitable for such purposes. For example, indium arsenide (InAs) has a temperature coefficient of $5.7 \cdot 10^{-6}/°$ C., and indium antimonide (InSb) has a temperature coefficient of approximately $6 \cdot 10^{-6}/°$ C.

We claim:

1. A magnetic-field responsive resistance device for a Hall generator comprising a thin, fragile, flat rectangular resistance wafer of crystalline semiconductor substance having two terminals on respective opposite plate sides and two Hall electrodes centrally of the other two opposite sides respectively, four circuit leads attached to said respective terminals and electrodes, and two rigid plates of rectangular shape covering the respective flat surfaces of said wafer and forming a rigid unit together with said wafer, said two plates consisting of ceramic sinter material, said semiconductor material and sinter ceramic having thermal coefficients of expansion of about the same decimal order of magnitude.

2. A magnetic-field responsive resistance device comprising a thin, fragile, flat resistance plate of crystalline semiconductor material having circuit leads attached thereto, said material consisting of substance selected from the group consisting of arsenide and antimonide of indium, and two plates of sinter ceramic in face-to-face contact with said resistance plate on opposite sides thereof, said semiconductor material and sinter ceramic having thermal coefficients of expansion of about the same decimal order of magnitude.

3. In a resistance device according to claim 2, said ceramic sinter material having a temperature coefficient of expansion between about $5.10^{-6}$ and about $7.10^{-6}$ per ° C.

4. In a resistance device according to claim 2, said ceramic sinter material consisting of aluminum oxide ($Al_2O_3$).

5. In a resistance device according to claim 2, said ceramic sinter material consisting of ferrite.

6. A Hall effect device comprising a thin, fragile, crystalline semiconductor body having two opposite large area faces and two pairs of opposite edge faces, current supply electrodes coextensive with at least a major part of the length of each of one pair of said edge faces and at least one Hall voltage electrode for taking off a Hall voltage, said Hall electrode being located adjacent another one of the edges of said body, a rigid plate of sinter ceramic supporting and completely covering one of the large area faces, another rigid plate of sinter ceramic covering an area of the opposite large area face between the two current supply electrodes and leaving exposed the said current supply electrodes and the Hall voltage electrode, conductor leads connected to the electrodes, and an embedding envelope of insulating resin material about and sealing said rigid plates, the semiconductor body, said electrodes and the portions of the conductor leads connected to said electrodes.

7. The apparatus of claim 6, said semiconductor material and sinter ceramic having thermal coefficients of expansion of about the same decimal order of magnitude.

8. The apparatus of claim 6, said semiconductor material being taken from the group consisting of arsenide and antimonide of indium, namely, InAs and InSb, said semiconductor material and sinter ceramic having thermal coefficients of expansion of about the same decimal order of magnitude.

9. A Hall effect device comprising a thin, fragile, crystalline semiconductor body having two opposite large area faces and two pairs of opposite edge faces, current supply electrodes coextensive with at least a major part of the length of each of one pair of said edge faces and at least one Hall voltage electrode for taking off a Hall voltage, said Hall electrode being located adjacent another one of the edges of said body, a rigid plate of sinter ceramic supporting and completely covering one of the large area faces, another rigid plate of sinter ceramic covering an area of the opposite large area face between the two current supply electrodes and leaving exposed the said current supply electrodes and the Hall voltage electrode, conductor leads connected to the electrodes, and an embedding envelope of insulating resin material about and sealing said rigid plates, the semiconductor body, said electrodes and the portions of the conductor leads connected to said electrodes, said semiconductor material being taken from the group consisting of arsenide and antimonide of indium, namely, InAs and InSb, said semi-conductor material and sinter ceramic having thermal coefficients of expansion of about the same decimal order of magnitude.

10. A magnetic-field responsive resistance device for a Hall voltage generator comprising a thin, fragile, flat resistance plate of crystalline semiconductor material having current supply circuit leads attached thereto, and having a Hall voltage output electrode, two substantially rigid plates of sinter ceramic, each located at opposite faces of said semiconductor plate, and each extending over at least the major portion of the area of the opposite faces of the semiconductor plate, said two ceramic plates and semiconductor plate having thermal coefficients of expansion of about the same decimal order of magnitude.

11. The device defined in claim 10, the ceramic plates being of substantially the same thickness.

12. The device defined in claim 10, the device being embedded in an outer coating of electrically insulative resin material.

13. A magnetic-field responsive resistance apparatus, in which a magnetic-field sensitive resistance plate, having opposite large-area faces, is subjected to magnetic flux passing through said opposite large-area faces, said resistance plate comprising a thin, flat, brittle, fragile semiconductor body formed of an integral crystal having a thickness of the order of 0.01 mm., and of a semiconductor material exhibiting the Hall effect, said body having opposite electric connections thereto, the current axis between said connections being longitudinal to said large-area faces, two flat rigid self-sustaining plates of preformed pre-sintered ceramic material located at said large-area faces of the semiconductor plate, to support the semiconductor plate against breaking by flexure, at least one of said ceramic plates being at least substantially coextensive with the respective large-area surface of the semiconductor body that it supports, the other plate of ceramic being at least substantially coextensive with a major part of the other large-area surface of the semiconductor body, the sintered ceramic and the semiconductor crystalline material of said semiconductor body having thermal coefficients of expansion of about the same decimal order of magnitude, and means joining the three plates firmly together.

14. A magnetic-field responsive resistance apparatus, in which a magnetic-field sensitive resistance plate, having opposite large area faces, is subjected to magnetic flux passing through said opposite large-area faces, said resistance plate comprising a thin, flat, brittle, fragile semiconductor body formed of an integral crystal having a thickness of the order of 0.01 mm., and of a semiconductor material exhibiting the Hall effect, said body having opposite electric connections thereto, the current axis between said connections being longitudinal to said large-area faces, two flat rigid self-sustaining plates of preformed, pre-sintered ceramic material located at said large area faces of the semiconductor plate, to support the semiconductor plate against breaking by flexure, at least one of said ceramic plates being at least substantially coextensive with the respective large-area surface of the semiconductor body that it supports, the other plate of ceramic being at least substantially coextensive with a major part of the other large-area surface of the semiconductor body, the sintered ceramic and the semiconductor crystalline material of said semiconductor body having thermal coefficients of expansion of about the same decimal order of magnitude, and means joining the three plates firmly together, said joining means comprising a coating of electrically insulative resin around the peripheries of the ceramic plates.

15. A magnetic-field responsive resistance apparatus, in which a magnetic-field sensitive resistance plate, having opposite large-area faces is subjected to magnetic flux passing through said opposite large-area faces, said resistance plate comprising a thin, flat, brittle, fragile semiconductor body formed of an integral crystal having a thickness of the order of 0.01 mm., and of a semiconductor material exhibiting the Hall effect, said body having opposite electric connections thereto, the current axis between said connections being longitudinal to said large-area faces, two flat rigid self-sustaining plates of preformed, pre-sintered ceramic material located at said large-area faces of the semiconductor plate, to support the semiconductor plate against breaking by flexure, at least one of said ceramic plates being at least substantially coextensive with the respective large-area surface of the semiconductor body that it supports, the other plate of ceramic being at least substantially coextensive with a major part of the other large-area surface of the semiconductor body, the sintered ceramic and the semiconductor crystalline material of said semiconductor body having thermal coefficients of expansion of about the same decimal order of magnitude, and means joining the three plates firmly together, the two ceramic plates having the same thickness, so as to locate the semiconductor plate in a neutral middle zone, in the event of deformation by bending stresses.

16. The apparatus defined in claim 15, the semiconductor being taken from the group consisting of arsenide and antimonide of indium.

References Cited in the file of this patent

UNITED STATES PATENTS

| | | |
|---|---|---|
| 333,394 | Clark | Dec. 29, 1885 |
| 829,808 | Shipp | Aug. 28, 1906 |
| 1,948,382 | Johnson | Feb. 20, 1934 |
| 2,460,795 | Warrick | Feb. 1, 1949 |
| 2,692,321 | Hicks | Oct. 19, 1954 |
| 2,736,858 | Welker | Feb. 28, 1956 |
| 2,745,931 | Heibel | May 15, 1956 |

UNITED STATES PATENT OFFICE
CERTIFICATE OF CORRECTION

Patent No. 3,042,887                          July 3, 1962

Friedrich Kuhrt et al.

It is hereby certified that error appears in the above numbered patent requiring correction and that the said Letters Patent should read as corrected below.

In the heading to the printed specification, line 8, for "Sept. 15, 1958" read -- Sept. 25, 1958 --.

Signed and sealed this 20th day of November 1962.

(SEAL)
Attest:

ERNEST W. SWIDER
Attesting Officer

DAVID L. LADD
Commissioner of Patents